United States Patent
Huber

(10) Patent No.: US 7,019,990 B2
(45) Date of Patent: Mar. 28, 2006

(54) CONVERTER WITH DAMPING MECHANISM FOR THE AVOIDANCE OF RESONANCES

(75) Inventor: Norbert Huber, Teisendorf (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 58 days.

(21) Appl. No.: 10/756,891

(22) Filed: Jan. 14, 2004

(65) Prior Publication Data
US 2005/0013145 A1    Jan. 20, 2005

(30) Foreign Application Priority Data
Jul. 19, 2003    (DE) .............................. 203 11 104

(51) Int. Cl.
*H02M 1/12* (2006.01)
(52) U.S. Cl. ...................................... 363/39
(58) Field of Classification Search ................. 363/37, 363/39, 40, 44, 45, 46
See application file for complete search history.

(56) References Cited
U.S. PATENT DOCUMENTS

| | | | |
|---|---|---|---|
| 4,768,002 A * | 8/1988 | Cronin | ..................... 333/177 |
| 5,642,013 A | 6/1997 | Wavre | |
| 5,910,691 A | 6/1999 | Wavre | |
| 6,166,929 A * | 12/2000 | Ma et al. | ..................... 363/37 |
| 6,583,598 B1 | 6/2003 | Raith et al. | |
| 6,636,107 B1 * | 10/2003 | Pelly | ..................... 327/552 |
| 2002/0113562 A1 | 8/2002 | Raith et al. | |
| 2002/0113585 A1 | 8/2002 | Dillig et al. | |

FOREIGN PATENT DOCUMENTS

| | | |
|---|---|---|
| DE | 100 59 334 A1 | 6/2002 |
| DE | 100 64 213 A1 | 7/2002 |
| EP | 0 793 870 B1 | 7/1998 |

* cited by examiner

*Primary Examiner*—Adolf Berhane
(74) *Attorney, Agent, or Firm*—Brinks Hofer Gilson & Lione

(57) ABSTRACT

A converter with a damping mechanism for preventing resonances that includes a rectifier, an inverter and an intermediate circuit which connects the rectifier to the inverter. The intermediate circuit includes a first conductor connected to a first potential, a second conductor connected to a second potential that is different than said first potential and a current-compensated choke looped into the first conductor and the second conductor. The current-compensated choke includes a first winding and a second winding, wherein a first current flowing from the rectifier to the inverter flows through the first winding and a second current flowing back from the inverter to the rectifier flows through the second winding.

9 Claims, 2 Drawing Sheets

CONVERTER WITH DAMPING MECHANISM FOR THE AVOIDANCE OF RESONANCES

Applicant claims, under 35 U.S.C. §119, the benefit of priority of the filing date of Jul. 19, 2003 of a German utility model application, copy attached, Serial Number 203 11 104.4, filed on the aforementioned date, the entire contents of which is incorporated herein by reference.

BACKGROUND OF THE INVENTION

1. Field of the Invention

The present invention relates to a converter with a damping mechanism for preventing resonances, having a rectifier, an inverter and an intermediate circuit which connect the rectifier with the inverter, and having two conductors connected to different potentials.

2. Discussion of Related Art

Such converters are used for providing electrical drive mechanisms with energy.

Today, hardly any technological field can get along without modem, electronically commutated drive mechanisms. Therefore a continuous development process is taking place for making such drive mechanisms even more powerful, and in the course of this to make them useful for still further applications. So-called direct drive mechanisms, whose torque is directly transferred without a transmission to the desired application, for example, become generally accepted in more and more fields. Such direct drive mechanisms are already available for very high torques or, in the form of linear drive mechanisms, for very high forces.

Parasitic capacitances in the drive mechanism play an increasingly greater role as a result of the construction of such direct drive mechanisms, such as described in EP 0 793 870 B1, which corresponds to U.S. Pat. Nos. 5,642,013 and 5,910,691, the entire contents of each of which is incorporated herein by reference. In connection with a converter for supplying the drive mechanism with energy, systems capable of oscillations with relatively low resonance frequencies in the range of some 10 kHz are created.

Converters operating in accordance with the principle of the step-up converter in particular generate undesired excitations of these resonance frequencies because of system-related jumps in the voltage of the intermediate circuit. Thus, observations have already shown that in connection with such converters oscillations occurred at drive mechanisms with particularly high parasitic capacitances, and therefore particularly low resonance frequencies, which led to the destruction of the drive mechanism. In the course of this, voltages of such a size occurred at the neutral point of the drive mechanism that the insulation of the neutral point to ground was punctured by the partial discharge.

Several attempts have already become known for avoiding such problems. They have in common that the undesired resonance oscillations are damped. This is either performed directly at the drive mechanism or in the converter.

An example for the first mentioned attempt is provided by DE 100 59 334 A1, which corresponds to U.S. Pat. No. 6,583,598, the entire contents of which are incorporated herein by reference. How flashovers toward ground can be prevented by passive electrical components between the neutral point and ground is described there. However, the disadvantage of such solutions is that the additional electrical components require considerable structural space and can therefore not easily be employed with every application.

A solution within the converter is described in DE 100 64 213 A1, which corresponds to U.S. Patent Application Publication No. US 2002-113585 A1, the entire contents of which are incorporated herein by reference. Starting from the realization that the inductance of the input choke of the converter is an essential component of the oscillatory circuit consisting of converter and drive mechanism, a damping element is proposed, which is integrated into the input choke of the converter and is transformer-coupled.

OBJECT AND SUMMARY OF THE INVENTION

It is an object of the present invention to make the damping of the undesired resonance oscillations possible in a further, particularly effective manner already in the converter.

This object is attained by a converter with a damping mechanism for preventing resonances that includes a rectifier, an inverter and an intermediate circuit which connects the rectifier to the inverter. The intermediate circuit includes a first conductor connected to a first potential, a second conductor connected to a second potential that is different than said first potential and a current-compensated choke looped into the first conductor and the second conductor. The current-compensated choke includes a first winding and a second winding, wherein a first current flowing from the rectifier to the inverter flows through the first winding and a second current flowing back from the inverter to the rectifier flows through the second winding.

A converter with a damping device for preventing resonances is described, which has a rectifier, an inverter and an intermediate circuit which connects the rectifier with the inverter and has two conductors connected to different potentials. A current-compensation choke has been looped into the intermediate circuit, so that a current flowing from the rectifier to the inverter flows through a first winding of the current-compensating choke, and a current flowing back from the inverter to the rectifier flows through a second winding of the current-compensating choke.

The current-compensating choke can be constructed in a particularly compact manner in that conducting foils are alternatingly wound on a core and are electrically insulated with respect to each other by insulating foils and through which currents flow in opposite directions from and to the inverter. By this the magnetic fields of the two currents compensate each other before they even magnetize the core of the choke through which the current flows. It is possible in this way to prevent the saturation of the core even in case of very high currents, such as can occur in converters for powerful drive mechanisms.

Further advantages, as well as details, of the present invention ensue from the subsequent description of preferred exemplary embodiments by the drawings.

DETAILED DESCRIPTION OF THE PREFERRED EMBODIMENTS

Figure 1:
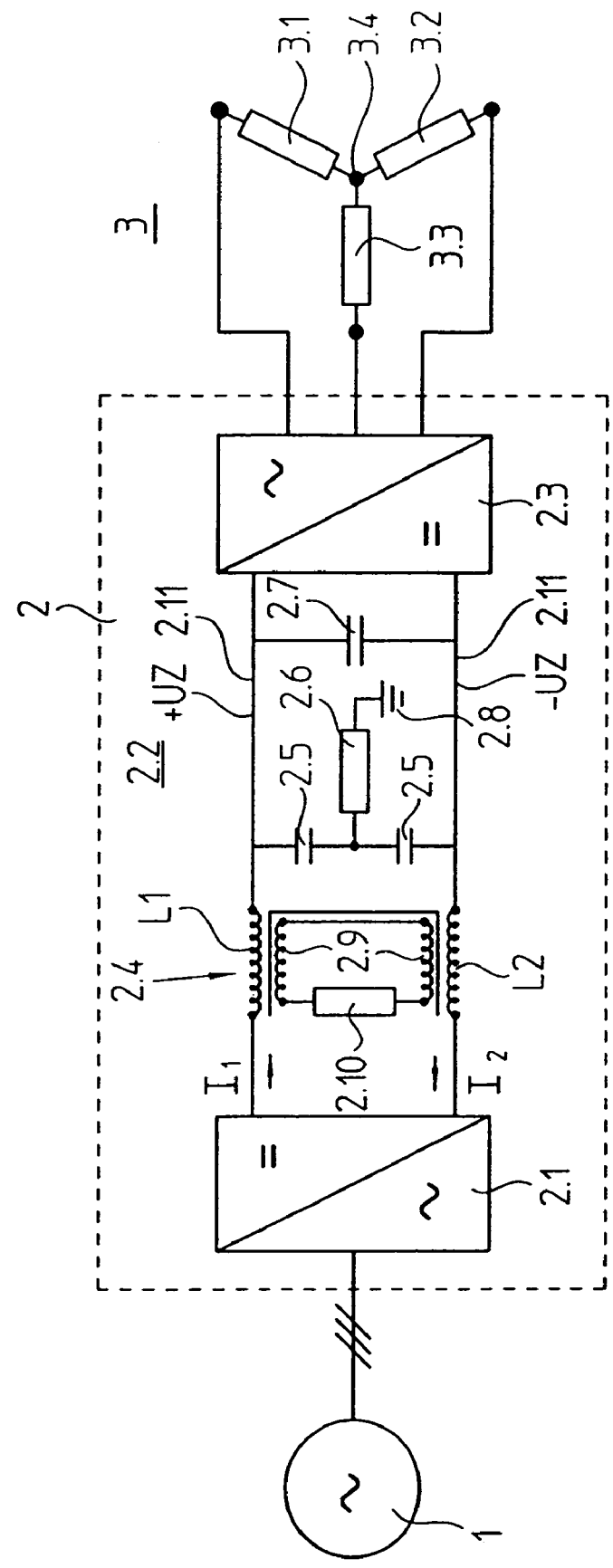
FIG. 1 is a block circuit diagram of an embodiment of a converter with a drive mechanism in accordance with the present invention.

FIG. 1 shows a network 1, whose three-phased a.c. voltage is supplied to a drive mechanism 3 via a converter 2. To this end, the a.c. voltage of the network 1 is first converted into a d.c. voltage in the converter 2 by a rectifier 2.1 operated in accordance with the principle of a step-up converter. This d.c. voltage is provided to an inverter 2.3 via an intermediate circuit 2.2. An intermediate circuit capacitor 2.7 here stores energy and stabilizes the voltage difference between the potentials +UZ and −UZ on the conductors 2.11 of the intermediate circuit 2.2. The d.c. voltage of the intermediate circuit 2.2. is again converted in the inverter 2.3. to an a.c. voltage, whose three phases are set in accordance with the desired control of the three phases 3.1, 3.2, 3.3 of the drive mechanism 3.

The drive mechanism 3 in FIG. 1 is connected in a star shape, however, the described resonances which are intended to be prevented by the present invention can also occur in a Delta connection. One of the connections of each of the three phases 3.1, 3.2, 3.3 of the drive mechanism 3 is wired together in the neutral point 3.4, and the respectively other connector of each phase 3.1, 3.2, 3.3 is connected with the output of the inverter 2.3.

Leakage capacitances or parasitic capacitances exist in the arrangement of the converter 2 and the drive mechanism 3 which, together with the inductances of the phases 3.1, 3.2, 3.3 and other components such as, for example, the network input choke of the rectifier, constitute an arrangement capable of oscillations. This arrangement capable of oscillations can have resonance frequencies for the above mentioned direct drive mechanisms, and in this case especially for those with a particularly large output, which are excited by the switching processes in the rectifier 2.1 operating in accordance with the principle of a step-up converter. In such a rectifier 2.1, which is primarily employed in connection with converters capable of feedback, the potential +UZ and −UZ of the conductors 2.11 can jump considerably. For example, the potential +UZ, which is nominally at 325 V (all potentials in relation to ground, or ground potential), can jump between 0 V and 650 V, while at the same time the potential −UZ, which is nominally at −325 V, jumps between −650 V and 0 V. The potential difference of 650 V is maintained constant by the intermediate circuit capacitor 2.7 here. However, these potential jumps can still excite resonance oscillations because of the parasitic capacities. In this case voltages which lay far above the employed voltage of the partial discharge at the neutral point 3.4 were observed and therefore led to the destruction of the drive mechanism 3.

For damping such harmful resonance oscillations, or to prevent them completely, it is now proposed to switch a current-compensated choke 2.4 into the intermediate circuit 2.2. Such a current-compensated choke 2.4 lets a d.c current 11 pass without hindrance from the rectifier 2.1 to the inverter 2.3, because the magnetic field created by the current 11 flowing in the first winding L1 to the inverter 2.3 is just being compensated again (except for unavoidable leakage losses) by the magnetic field created by the current 12 flowing back from the inverter 2.3 in the winding L2.

Currents passing through both windings L1, L2, but in the same direction, experience the full inductance of the windings L1, L2 as long as the core of the turns is not magnetically saturated.

Such currents are generated by the above described jumping of the potentials at the output of the rectifier 2.1 if the potentials +UZ and −UZ are maintained at the input of the inverter 2.3 by at least one clamp capacitor 2.5. At least one such clamp capacitor 2.5 must act between a connector of the current-compensated choke 2.4 connected with the inverter 2.3 and ground 2.8 in order to clamp the potential (for example +UZ) at this connector. The potential of the other connector (in the example −UZ) is then maintained via the intermediate circuit capacitor 2.7. However, as represented in FIG. 1 it is advantageous to connect two clamp capacitors 2.5 from each one of the outputs of the current-compensated choke 2.4 connected with the inverter 2.3 with the ground 2.8. In rare exceptional cases it may be possible to do without the clamp capacitors 2.5 if parasitic capacitances take over their function, or if appropriate capacitances are already present inside the converter 2.

Thus, if the clamp capacitors 2.5 are of sufficient size, the current-compensated choke 2.4, together with the clamp capacitors 2.5, causes that the potential +UZ, −UZ of the conductors 2.11 of the intermediate circuit 2.2 at the input of the inverter 2.3 no longer jumps, or clearly jumps less, or a jump is changed into a slow rise. Because of this, the excitation of resonances and the resultant negative effects, such as excess voltages at the neutral point 3.4 of the drive mechanism, are prevented. To this end it is necessary that the current-compensated choke 2.4 be of such dimensions that a potential jump at the output of the rectifier 2.1 can remain at the input of the current-compensated choke 2.4 until the potential jumps back again, without the core of the current-compensated choke 2.4 becoming saturated. Only in this way is it possible to prevent that the potential jump also becomes noticeable at the output of the current-compensated choke 2.4. An advantageous construction of such a current-compensated choke 2.4, which is more saturation-resistant and compact, will be described below.

It should be noted that the current-compensated choke 2.4 and the clamp capacitor, or capacitors 2.5, are themselves capable of oscillation. It is therefore necessary to provide damping of this oscillatory circuit. Several options for this exist.

Such damping can be achieved by a clamp resistor 2.6, which is connected in series with the clamp capacitor 2.5 to ground 2.8, the same as by a damping resistor 2.10, which is transformer-coupled by secondary coils 2.9 of the current-compensated choke 2.4. If these secondary coils 2.9 are wound from resistance wire, no separate damping resistor 2.10 is required. A solution which achieves damping by a clamp resistor 2.6 and a damping resistor 2.10 is particularly advantageous.

A further option for damping includes connecting an impedance (for example a series circuit of a capacitor and a resistor) parallel with respect to at least one of the windings L1, L2 of the current-compensated choke 2.4.

Conventional current-compensated chokes 2.4 have a common core (for example a circular core), on which the two windings L1 and L2 are attached at different locations. The compensation of the magnetic flux generated in the windings L1, L2 thus takes place only within the core. This contains the danger that the core becomes magnetically saturated and therefore the effect of the current-compensated choke 2.4 is lost.

Advantageous embodiments of the current-compensated choke 2.4 will now be described by FIGS. 2 and 3, which result in clearly sturdier current-compensated chokes 2.4, i.e. those with a reduced tendency to become saturated. The basic concept lies in arranging the windings L1 and L2 on a common core 4 in such a way that the magnetic fields of alternatingly arranged areas of the windings L1, L2 already cancel each other out mutually, without contributing to the magnetization of the common core 4.

Such a type of winding can be realized by two common wires, which are wound alternating with each other. A higher inductance per volume, and therefore smaller windings with the same inductance, are obtained by a construction in accordance with FIG. 2. The first and second windings L1, L2 of the current-compensated choke 2.4 are here realized by conducting foils 5, which are wound alternatingly with each other and together on the core 4. These conducting foils 5 include aluminum or copper, for example. Insulating foils 6 have been placed between the conducting foils 5 in order to insulate the windings L1 and L2 against each other. An insulating coating of the conducting foils 5, instead of the insulating foils 6, is also conceivable for simplifying the structure. Such a coil body 7 has four connectors, two of which are assigned to each one of the windings L1 and L2.

The currents 11 and 12 flow counter to each other through the conducting foils 5. The magnetic fields generated in the course of this compensate each other, except for leakage losses within the windings L1, L2, and therefore do not contribute to the magnetization of the core 4.

Figure 2:
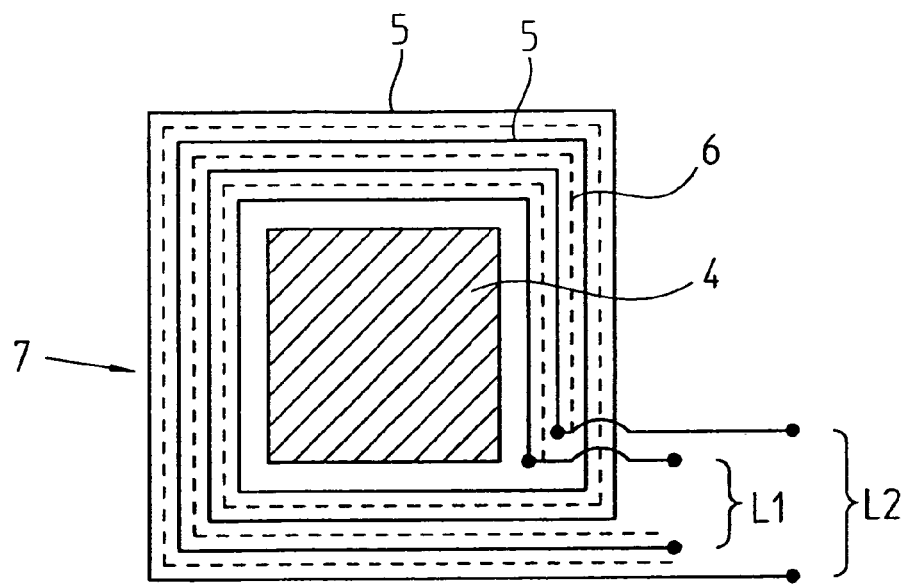
FIG. 2 shows a cross section through an embodiment of a current-compensated choke to be used with the converter of FIG. 1 in accordance with the present invention.
Figure 3:
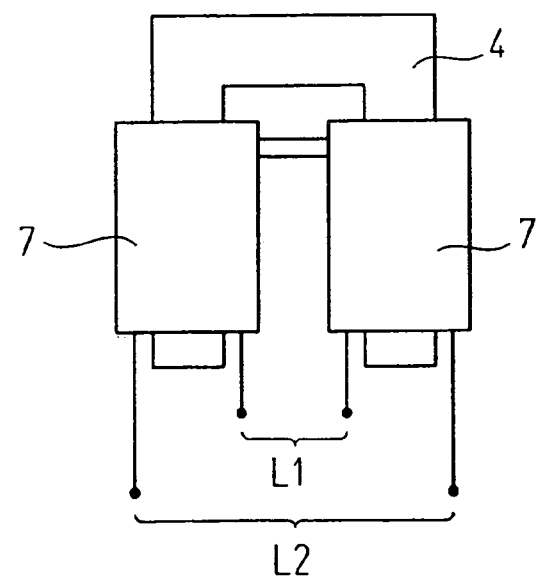
FIG. 3 is a view from above on the current-compensated choke of FIG. 2.

In accordance with FIG. 3 it is also possible to combine two such coil bodies 7 represented in FIG. 2, which have been wound on a common, advantageously U-shaped core 4, to form a current-compensating choke 2.4 with two connectors for each of the windings L1 and L2. This arrangement differs from conventional current-compensating chokes 2.4 in that each one of the two coil bodies 7 supports portions of the windings L1 and L2, so that here, too, a current which flows in opposite directions through the windings L1 and L2 does not contribute to the magnetization of the core 4.

The circuit herein described effectively suppresses or reduces the potential jumps in the intermediate circuit 2.2 of a converter 2 operating in accordance with the principle of a step-up converter. The excitation of low resonance frequencies, which otherwise would lead to the destruction of the drive mechanism, are dependably prevented, or are damped to a non-critical extent. The circuit can be simply integrated into existing converters because of the described compact structure of the current-compensating choke 2.4.

Besides the exemplary embodiments described, it is understood that alternative variants also exist within the scope of the present invention.

I claim:

1. A converter with a damping mechanism for preventing resonances, comprising:
   a rectifier;
   an inverter; and
   an intermediate circuit which connects said rectifier to said inverter, said intermediate circuit comprising:
   a first conductor connected to a first potential;
   a second conductor connected to a second potential that is different than said first potential;
   a current-compensated choke looped into said first conductor and said second conductor, said current-compensated choke comprising:
   a first winding; and
   a second winding, wherein a first current flowing from said rectifier to said inverter flows through said first winding and a second current flowing back from said inverter to said rectifier flows through said second winding, wherein said first winding and said second winding are wound on a common core and said first winding and said second winding are arranged in such a way that magnetic fields of alternatingly arranged areas of said first winding and said second winding already cancel each other out before contributing to a magnetization of said common core.

2. The converter in accordance with claim 1, wherein magnetic fields generated within said common core by equal portions of said first current and said second current flowing to and from said inverter cancel each other out.

3. The converter in accordance with claim 2, wherein said first winding and said second winding are arranged in such a way that magnetic fields of alternatingly arranged areas of said first winding and said second winding already cancel each other out before contributing to a magnetization of said common core.

4. The converter in accordance with claim 1, wherein said first winding comprises a first set of conducting foils and said second winding comprises a second set of conducting foils, wherein said first set and second set of conducting foils are alternatingly and together wound on said common core.

5. The converter in accordance with claim 3, wherein said first winding comprises a first set of conducting foils and said second winding comprises a second set of conducting foils, wherein said first set and second set of conducting foils are alternatingly and together wound on said common core.

6. The converter in accordance with claim 1, wherein at least one of said first potential and said second potential is electrically clamped by a clamp capacitor connected to ground.

7. The converter in accordance with claim 6, further comprising a clamp resistor connected to ground in series with said clamp capacitor.

8. The converter in accordance with claim 1, wherein said current compensated choke further comprises a dampening device that damps oscillations of said current-compensated choke.

9. The converter in accordance with claim 8, wherein said dampening device comprises a damping resistor which is transformer-coupled to said first and second windings via secondary coils of said current compensated choke.

* * * * *